Sept. 4, 1923.                                    1,467,152
R. FULLER
FOUR-WHEEL DRIVE FOR ELECTRIC VEHICLES
Filed Oct. 21, 1918          4 Sheets-Sheet 2

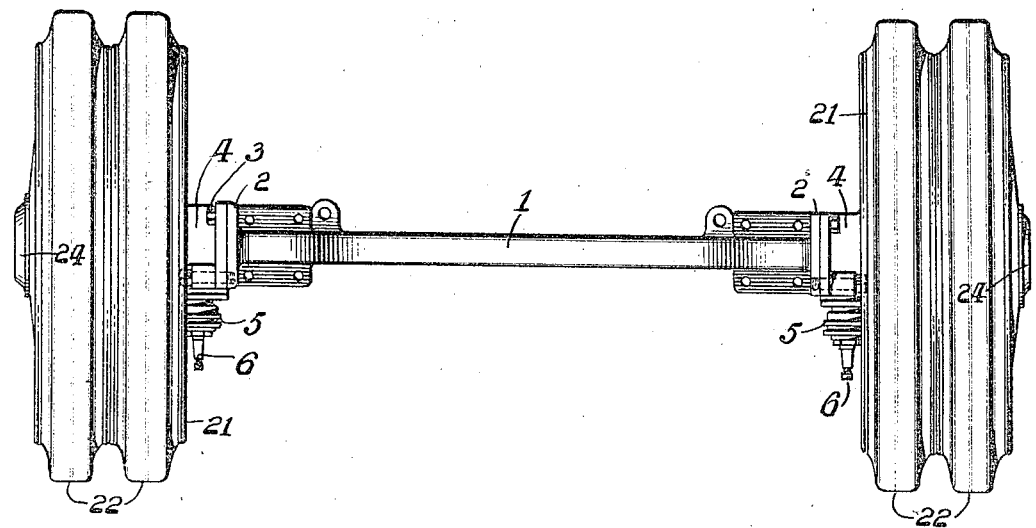
Fig. 1.
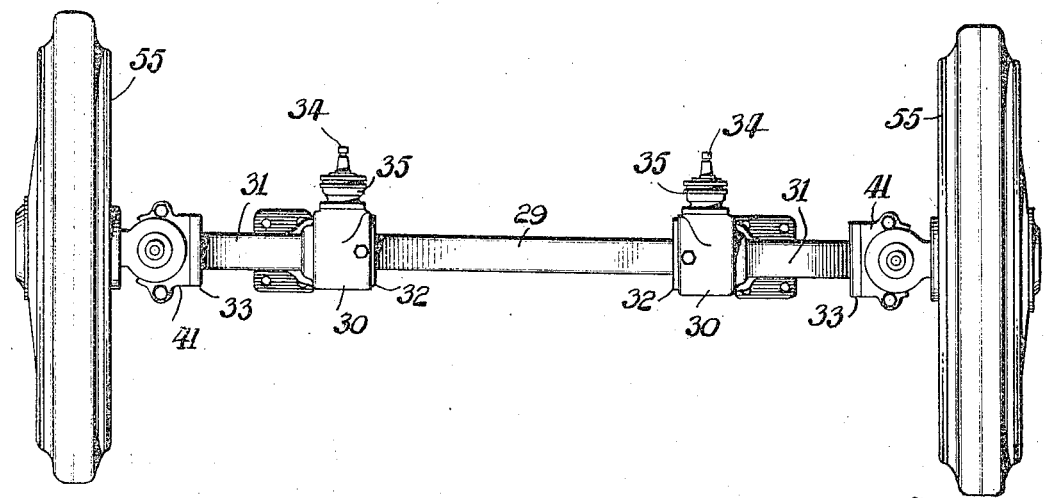
Inventor
RODOLPHUS FULLER

Rodolphus Fuller, Inventor

By *[signature]*

Attorney

Sept. 4, 1923.

R. FULLER 1,467,152

FOUR-WHEEL DRIVE FOR ELECTRIC VEHICLES

Filed Oct. 21, 1918     4 Sheets-Sheet 3

Inventor
RODOLPHUS FULLER
By
Attorneys

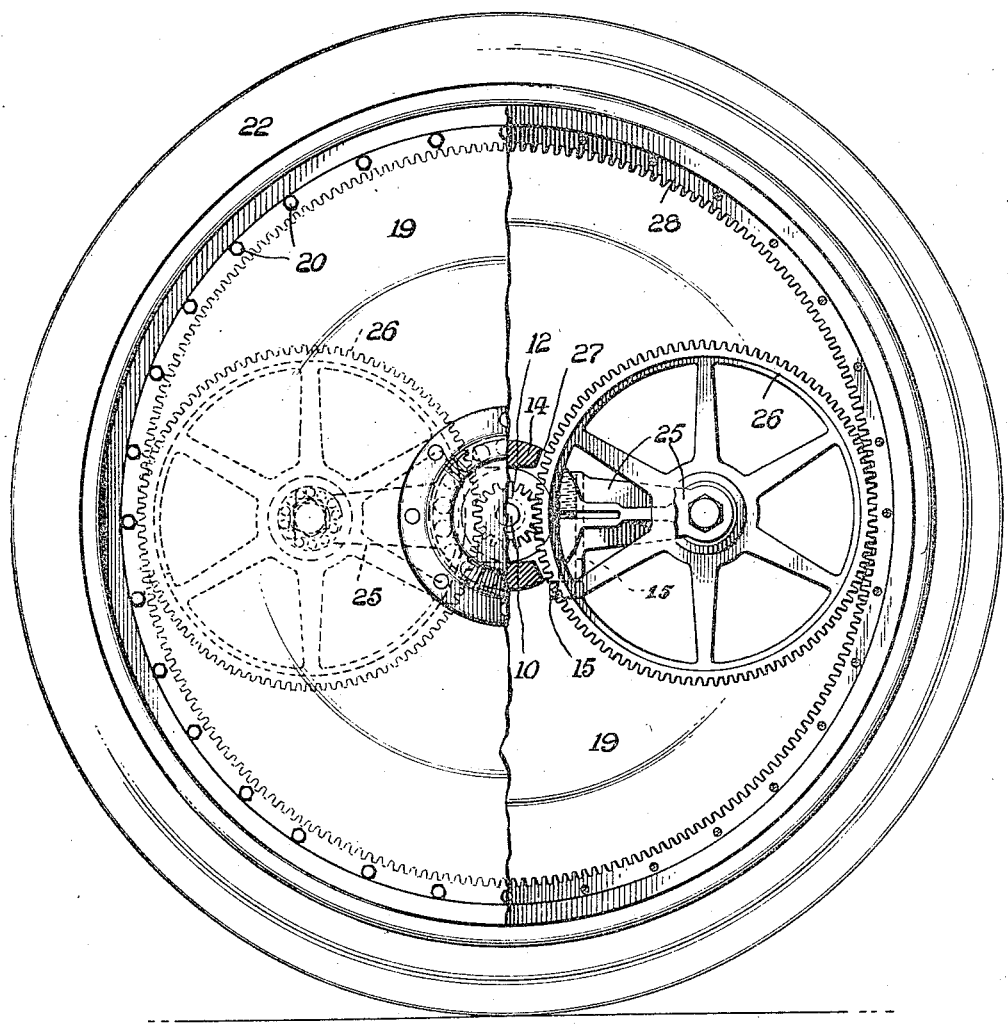

Patented Sept. 4, 1923.

1,467,152

UNITED STATES PATENT OFFICE.

RODOLPHUS FULLER, OF DETROIT, MICHIGAN.

FOUR-WHEEL DRIVE FOR ELECTRIC VEHICLES.

Application filed October 21, 1918. Serial No. 259,012.

*To all whom it may concern:*

Be it known that I, RODOLPHUS FULLER, a citizen of the United States of America, residing at Detroit, in the county of Wayne and State of Michigan, have invented certain new and useful Improvements in Four-Wheel Drives for Electric Vehicles, of which the following is a specification, reference being had therein to the accompanying drawings.

In my Patent No. 994,993, granted June 13, 1911, there is disclosed a system of electric motor control which is capable of general application in electric power transmission mechanism where great flexibility is required in starting and stopping with heavy loads, and it is particularly applicable to the control of electric power trucks, tramways and the like, designed for transporting heavy loads and which are driven by electric power generated on the vehicle itself and transmitted to the wheels of the vehicle through separate motors in suitable driving connection therewith. The separate motor drive necessitates the transmission of power, by mechanical means, from the motors to the wheels of the vehicle, and it is to such mechanical power transmission mechanism that this invention particularly relates, and may be generally considered as a four-wheel drive.

The present invention aims to provide a four-wheel drive mechanism wherein the transmission of power from separate motors to the peripheries of the wheels is accomplished in an economical, safe and durable manner, without any danger of vehicle axles, knuckles and wheels being fractured or subjected to excessive strains and stresses which would unnecessarily increase the load on the motor; it being a desideratum to accomplish the transmission of power with minimum friction and as direct as possible to the wheels of the vehicle.

My invention further aims to provide a four-wheel drive which when controlled by a system of electric distribution, as disclosed in my prior patent is particularly applicable to large passenger busses, since the independent drive to the wheels of the bus will permit of the same being practically turned in its own length, besides facilitating its manipulation in congested localities.

It is in this connection, that the four-wheel drive may be advantageously utilized for military purposes, particularly in the large tanks and vehicles employed for moving artillery. By eliminating change speed gear transmission mechanism and independently and electrically controlling the speed of each vehicle wheel or caterpillar tread member, it is possible to apply power where needed and move vehicles over territory which would be prohibitive by the usual driving mechanism.

My invention will be hereinafter more fully considered and reference will now be had to the drawings, wherein—

Figure 1 is a plan of the front and rear axle assembly of a vehicle;

Fig. 4 is a side elevation of one of the wheels, partly broken away and partly in section.

Figure 2:
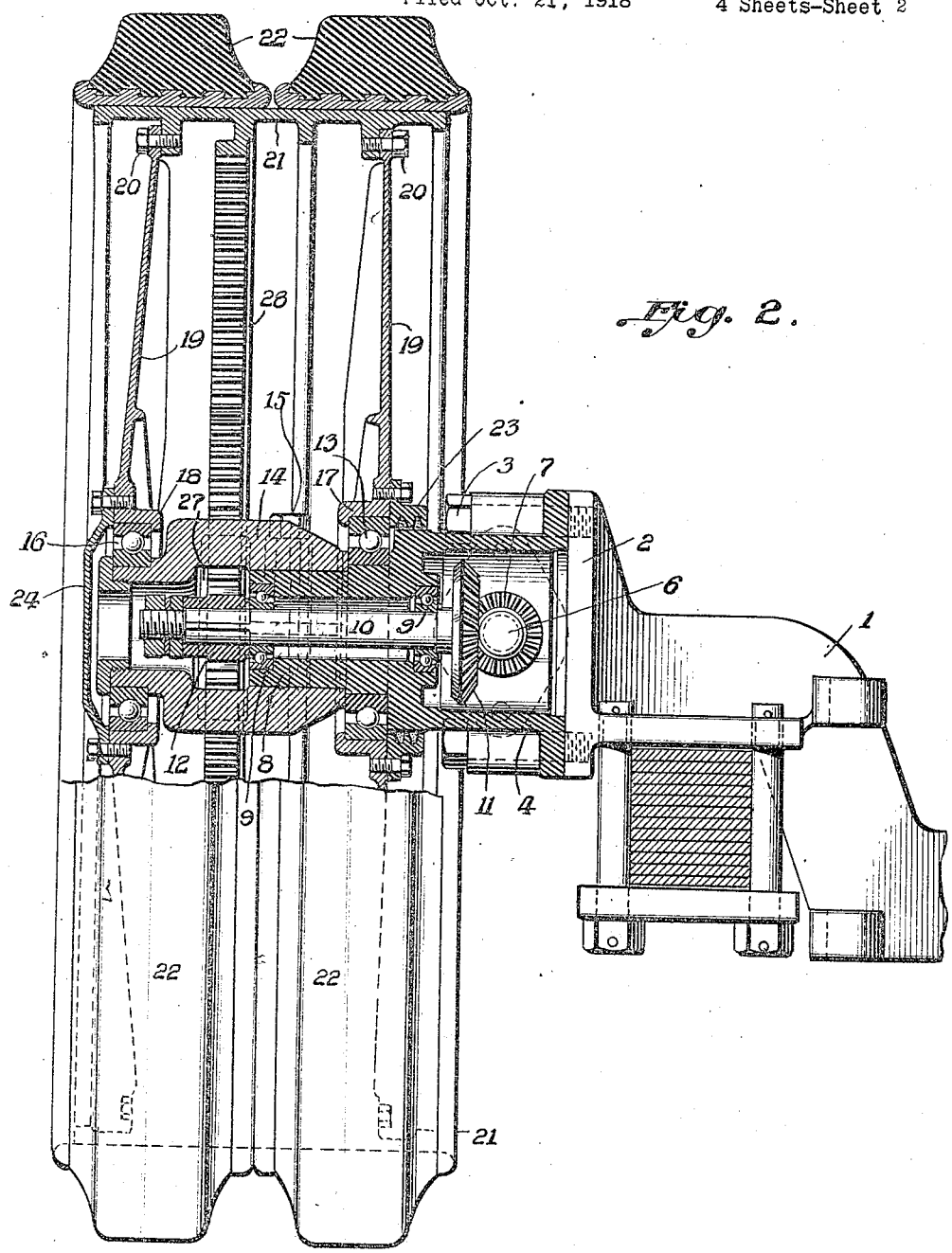
Fig. 2 is a rear elevation of one of the rear wheels of the rear axle, partly broken away and partly in section.

Considering the rear axle assembly, the reference numeral 1 denotes an axle having end faces 2, and in proximity to these end faces are spring perches and such other structures as are essential for the support or suspension of a chassis or body relative to the rear axle.

Connected to the end faces 2 by screw bolts 3 or other fastening means are gear housings 4, and since the gear housings at the ends of the axles are identical in construction, also the rear wheel construction, I deem it only necessary to describe the construction at one end of the axle. The gear housing 4 has its front or rear wall, preferably the former, provided with a take-apart bearing 5 for a short shaft 6 which has the inner end thereof provided with a beveled gear wheel 7, and provision is made for coupling a suitable driven shaft or member to the outer end of the shaft 6. The outer end of the gear housing 4 terminates in a hollow spindle 8 and set in the ends of said hollow spindle are anti-frictional bearings 9. Journaled in the bearings 9 concentrically of the hollow spindle 8 is a spindle shaft 10 having the inner end thereof provided with a large beveled gear wheel 11 meshing with the gear wheel 7, and suitably fixed on the outer end of the spindle shaft 10 is a small gear wheel 12.

The periphery of the hollow spindle 8 is stepped with one stepped portion thereof supporting an anti-frictional bearing 13 and another stepped portion thereof supporting a hollow stationary hub 14 which may be clamped or otherwise fixed relative to the spindle 8 by screw bolts 15. The hollow stationary hub 14 provides clearance for the outer end of the spindle shaft 10 and on the outer end of the stationary hub 14 is an anti-frictional bearing 16 that cooperates with the anti-frictional bearing 13 in supporting the inner and outer hub portions 17 and 18 of a wheel. For a heavy vehicle, as a passenger bus, truck or the like, it is preferable to use a wheel having a wide tread or more than one tire, and such a wheel has been illustrated. The wheel, as shown, has its inner and outer hub portions 17 and 18 integral with webs 19 that are connected, as at 20, to a wide felly member 21 supporting tires 22. This type of wheel has been simply shown as an example of a heavy duty wheel or driven member, and to protect the mechanism or parts located between the webs 19 of said wheel the inner hub portion 17 has a dust ring guard 23 connected thereto and a cap 24 is connected to the outer hub portion 18, these elements cooperating with the webs 19 of the wheels in providing an enclosure for the driving mechanism of the wheel.

The stationary hollow hub 14 has a yoke composed of sets of opposed arms 25, best shown in Fig. 4, and rotatable in the ends of said yoke are large gear wheels or pinions 26 that mesh with the small gear wheel 12; the hub 14 being cut away or recessed, as at 27 to provide clearance for the large gear wheels or pinions 26. These large gear wheels or pinions mesh with an internal rack 28 carried by the felly member 1 between the webs 19 thereof. The internal rack 28 is contiguous to the tread or periphery of the rear wheel and the elements 10, 11, 12, 26 and 28 constitute a reduction gear mechanism which permits of the wheel being operated at a reduced speed relative to the shaft 6, which may be coupled direct to the armature shaft of a motor. With the wheel free to revolve about the stationary hub 14 and the spindle 8, it is apparent that power may be easily transmitted thereto, and with the power transmission mechanism completely enclosed, it is impossible for dust and foreign matter to interfere with the mechanism within the wheel.

Figure 3:
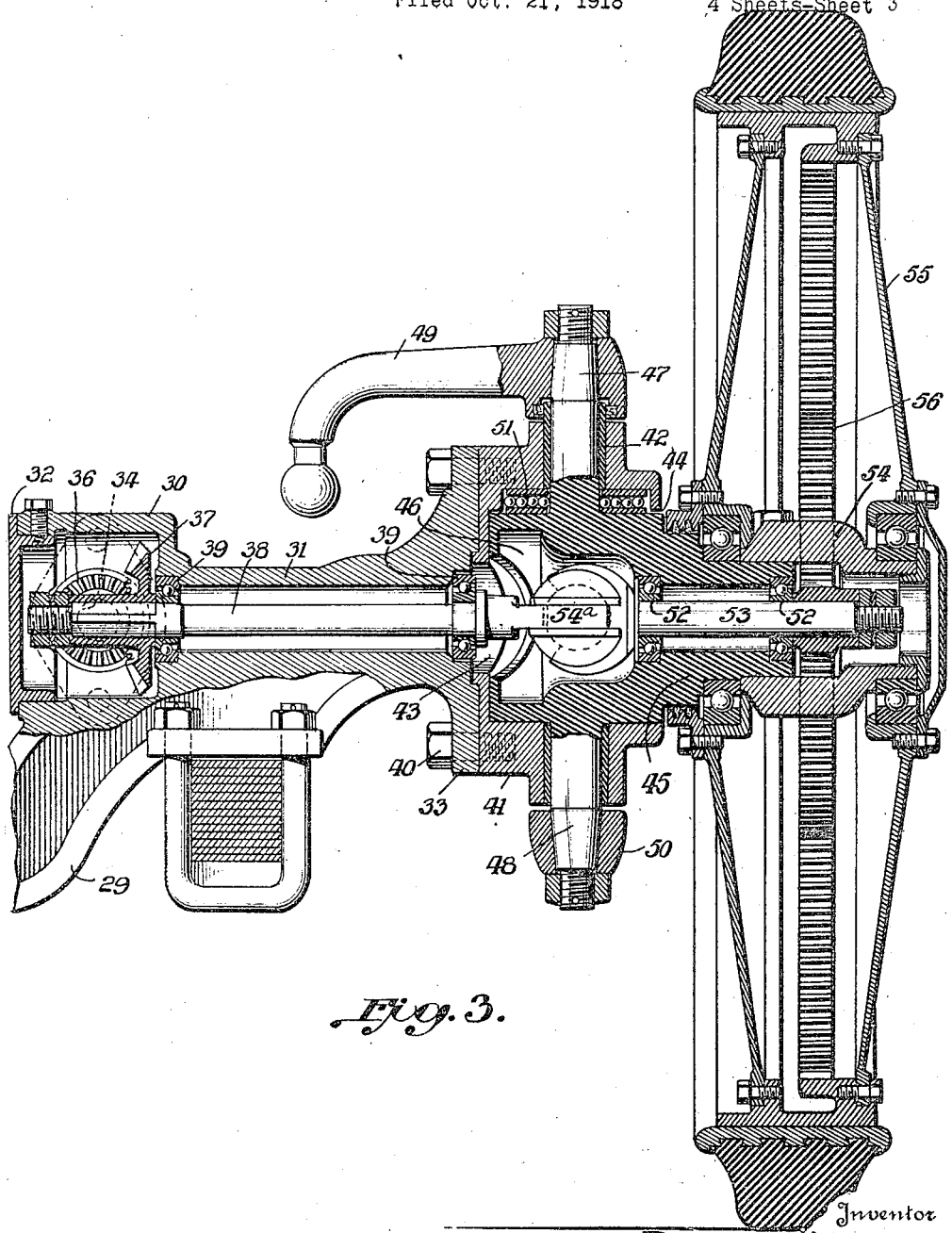
Fig. 3 is a vertical longitudinal sectional view of a portion of a front axle and one of its wheels, showing a steering knuckle through which power is transmitted.

Reference will now be had to the front axle assembly, shown in Figs. 1 and 3, and wherein the reference numeral 29 denotes the axle with both ends thereof similar. Each end of the axle has an integral gear housing 30 and a longitudinal bearing portion 31, said gear housing being provided with a detachable cover 32 and said bearing portion providing an end face 33 at the end of the axle.

Extending into the gear housing 30 is a driven shaft 34 which is supported by a take-apart bearing 35, carried by the gear housing 30. The inner end of the driven shaft 34 has a beveled gear wheel 36 meshing with a similar gear wheel 37 suitably mounted on the inner end of a drive shaft 38 extending through the bearing portion 31 and journaled in anti-frictional bearings 39 set in the ends of the bearing portion 31.

Connected to the end face 33 of the bearing portion 31 by screw bolts 40 or other fastening means is a knuckle housing 41 which has vertically alining openings provided with bushings 42; a side opening 43 providing clearance for the outer end of the drive shaft 38, and another side opening 44 providing clearance for the stepped spindle 45 of the knuckle 46. The knuckle 46 is adjustable in the housing 41 and may be swung in a lateral plane said knuckle having trunnions or studs 47 and 48 extending through the bushing 42. The trunnion or stud 47 is provided with a fixed steering arm or connection 49 and the trunnion or stud 48 has a nut or holdfast device 50 that prevents vertical displacement of the knuckle 46 and its housing.

A suitable anti-frictional bearing 51 is placed on the knuckle 46 in the housing 41 and this anti-frictional bearing sustains the greater part of the load on the front axle relative to the knuckle 46.

The stepped spindle 45 of the knuckle 46 has anti-frictional bearings 52 for a spindle shaft 53 which has the inner end thereof connected to the drive shaft 38 by a conventional form of universal joint 54ª housed within the knuckle 46, said knuckle being recessed and apertured sufficiently to provide clearance for the universal joint and the outer end of the drive shaft 38, so that this shaft may be continuously in driving relation to the spindle shaft 53 to impart movement thereto from the driven shaft 34.

On the stepped spindle 45 of the knuckle 46 is a fixed hub 54 and this hub supports a rotatable wheel generally designated 55, said wheel being constructed somewhat similar to the rear wheel, with the exception that the wheel 55 has a single tire or tread of less width than the rear wheel. The front wheel 55 has movement imparted thereto from the spindle shaft 53 by reduction gearing, generally designated 56, said reduction gearing being similar to the elements 12, 22 and 28 associated with the rear wheel. A comparison of Fig. 3 of the drawings with Fig. 2 will show the front wheels to be practically the same construction as the rear wheels, and as before stated, these wheels may represent such driving members as impart movement to a caterpillar tread member or other devices for moving a vehicle.

It is obvious that the front wheels of the vehicle can be driven similar to the rear wheels thereof, the front wheels possessing the further advantage of being steered or guided by a suitable steering mechanism. It is also obvious that all of the wheels of a vehicle may be constructed to be steered similar to the wheels shown in Fig. 3, and in consequence of such an arrangement it would be possible in a four point drive vehicle to turn said vehicle practically in its own length. This is especially true in connection with a tank or vehicle having caterpillar traction members.

As pointed out in the beginning, the four-point drive mechanism has been primarily designed to be operated from independent sources of power, particularly electric motors supplied with power from an engine driven generator, all being carried on a single vehicle or trailers attached thereto. With an electric motor coupled to each one of the shafts 6 and 34, it is apparent that the operation of each wheel of the vehicle, whether it be three, four or six wheels, can be readily controlled, and consequently a vehicle moved with facility.

What I claim is:—

1. An axle having a longitudinal bearing portion at each end thereof and in a plane above said axle, a gear housing at the inner end of each bearing, a knuckle housing at the outer end of each bearing, a knuckle having a greater part thereof enclosed by said knuckle housing and vertically alining trunnions extending through the top and bottom of said housing, a steering arm on the upper trunnion of said knuckles, a wheel on said knuckle, and means extending into said gear housing and through the longitudinal axle bearing and said knuckle for transmitting power to said wheel.

2. An axle having a gear housing adjacent each end, a longitudinally disposed bearing communicating with each gear housing, a drive shaft in said bearing and having one end thereof extending into said gear housing, means exteriorly of said gear housing and extending therein for imparting movement to said drive shaft, a knuckle housing connected to said bearing and into which the opposite end of said drive shaft extends, a knuckle having trunnions journaled in the top and bottom of said housing with one of said trunnions provided with a steering arm, a spindle shaft journaled in said knuckle and articulated with said drive shaft, and a wheel having movement imparted thereto from said spindle shaft.

3. An axle as called for in claim 1, wherein said knuckle seats on the bottom of said housing, and an anti-frictional bearing between the top of said knuckle and the top of said housing.

In testimony whereof I affix my signature in presence of two witnesses.

RODOLPHUS FULLER.

Witnesses:
 ANNA M. DORR,
 KARL H. BUTLER.